May 5, 1959   L. A. WEISS   2,884,948
LIQUID MEASURING AND CONTROL SYSTEM
Filed June 29, 1954   3 Sheets-Sheet 1

INVENTOR.
LEO A. WEISS
BY
Leonard H. King
AGENT

May 5, 1959   L. A. WEISS   2,884,948
LIQUID MEASURING AND CONTROL SYSTEM
Filed June 29, 1954   3 Sheets-Sheet 2
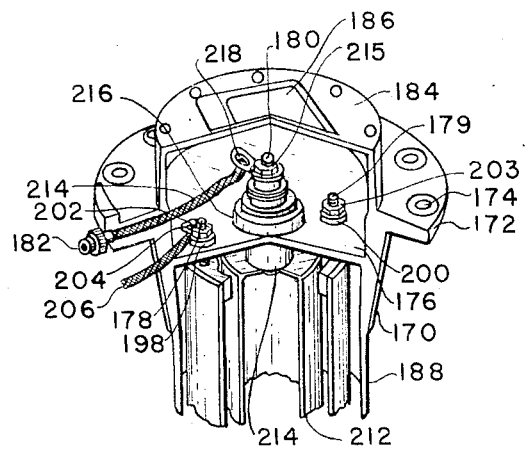
FIG. 2
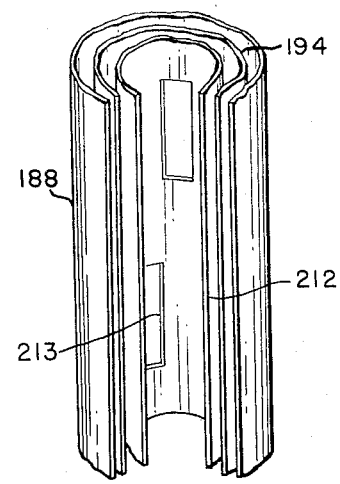
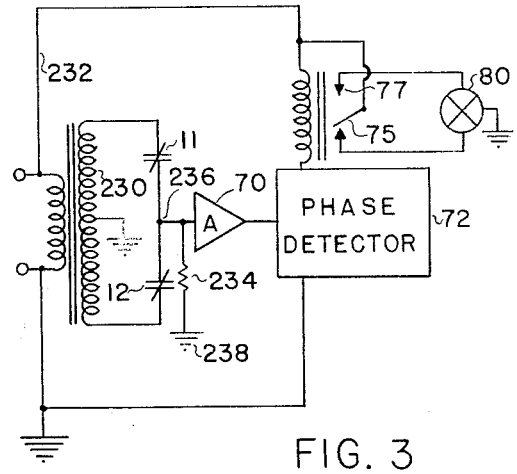
FIG. 3
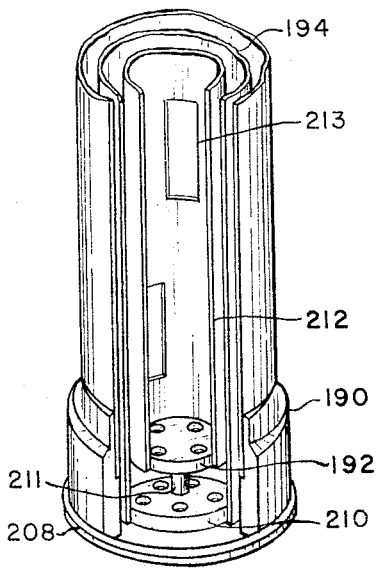
INVENTOR.
LEO A. WEISS
BY
Leonard H. King
AGENT

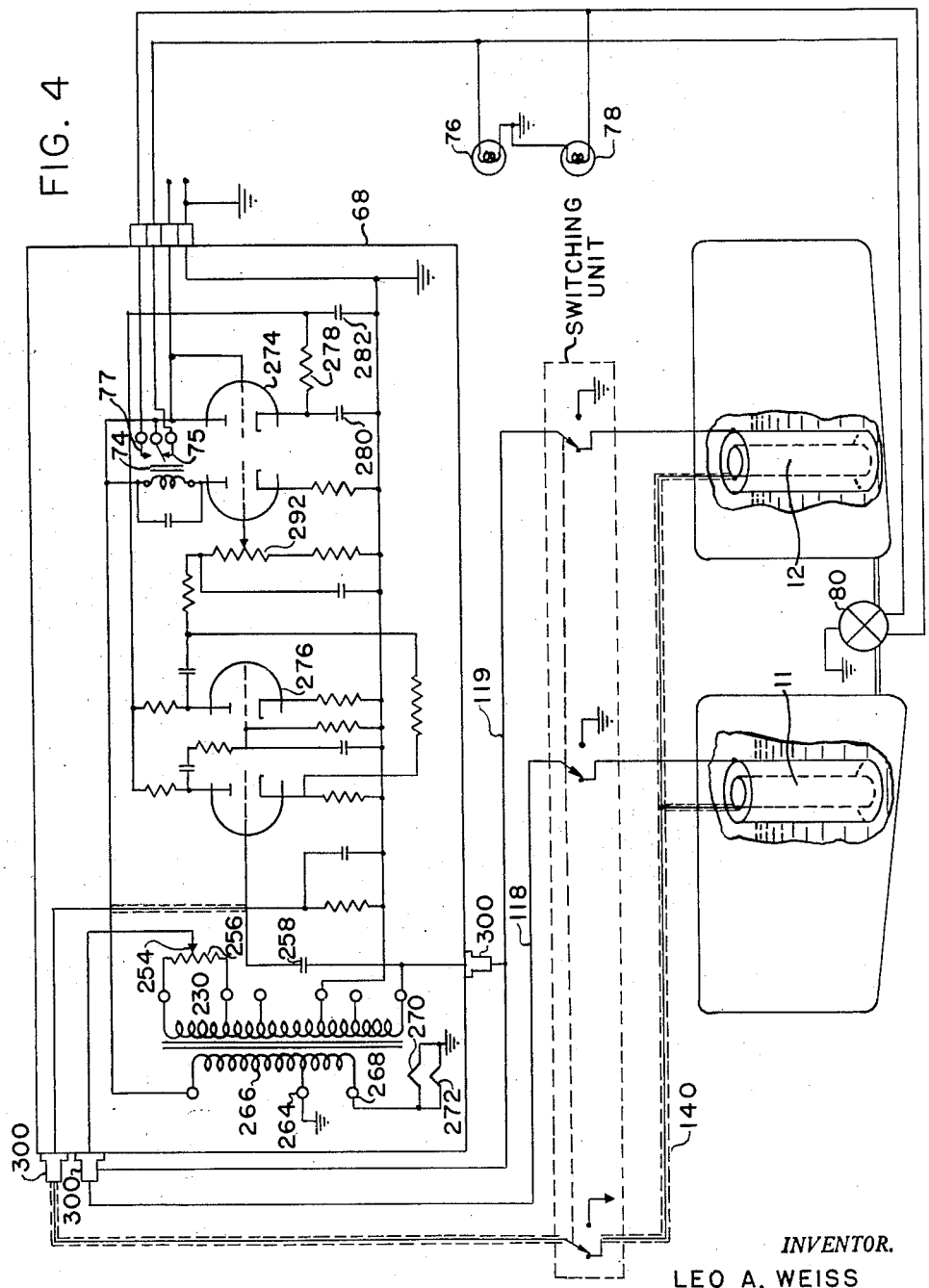

United States Patent Office 2,884,948
Patented May 5, 1959

2,884,948

LIQUID MEASURING AND CONTROL SYSTEM

Leo A. Weiss, Kings Point, N.Y., assignor to Avien, Inc., Woodside, N.Y.

Application June 29, 1954, Serial No. 439,960

5 Claims. (Cl. 137—390)

This invention relates to capacitive type liquid measuring systems and in particular to a combined system for measuring and controlling the distribution of fuel in an aircraft containing a plurality of fuel storage tanks.

This application is a continuation-in-part of copending application Serial Number 391,340, filed approximately November 10, 1953, entitled "Level Measuring and Control System," now abandoned.

In an aircraft, several tanks are used to contain the fuel supply. These tanks are distributed throughout various sections of the aircraft in order to maintain control of the aircraft's center of gravity. For example, tanks are conventionally located in both wings and fore and aft portions of the fuselage. It is desirable that there be provided a means for measuring the quantity of fuel present in the tanks and then displaying the information for the pilot's guidance. A requirement also exists for a means to automatically control the withdrawal of fuel from each tank and/or the distribution of fuel among the various tanks so as to maintain a predetermined relationship between the quantity of fuel remaining in each tank for the purpose of maintaining constant the center of gravity of the aircraft.

In a copending application of Robert J. Levine for "Capacitive Proportionating System," filed April 3, 1953, Serial Number 346,735, assigned to the assignee of the present invention, it was disclosed that a capacitance probe sensing system may be used to control the relationship between the weights of fuel in each of two tanks. This invention represents an improvement over the disclosed system in that it eliminate the need for an extra set of sensing capacitors where it is desired to install a center of gravity control system in an aircraft utilizing a capacitor type fuel quantity measuring system.

The elimination of a set of capacitors offers many advantages including reduction in weight, lower cost and frequently may make practical the installation of a center of gravity control system where no room exists for the installation of additional sensing capacitors.

In some aircraft, pumps are provided which circulate fuel between tanks while in other types of aircraft the center of gravity is controlled by careful programming of the withdrawal from the various tanks. There is disclosed hereinafter means for controlling pumps or valves to accomplish this result.

It is an object of this invention to provide a combined capacitive type fuel controlling and measuring system in which one set of sensing capacitors is switched automatically between a balancing control system and a quantity measuring system wherein a safety device is provided for the operative connection of a selected one of the said systems in the event of a failure to the switching means.

It is an object of this invention to provide a capacitive type fuel controlling system in which one set of sensing capacitors is switched automatically between a balancing control system and a quantity measuring system.

It is an object of this invention to provide an improved fuel measuring and control system for aircraft.

It is another object of this invention to provide a combined aircraft fuel distribution system control means and fuel quantity measuring apparatus which is light in weight.

The invention may be more readily understood by reference to the following description and appended drawings.

In Fig. 1 there is shown partly schematically and partly pictorially the system of this invention.

Fig. 2 shows a partially sectioned isometric view of a typical sensing capacitor.

Fig. 3 is a simplified circuit diagram of a balancing control bridge circuit.

Fig. 4 shows a preferred balancing control bridge, amplifier and detector circuit.

Figure 1:
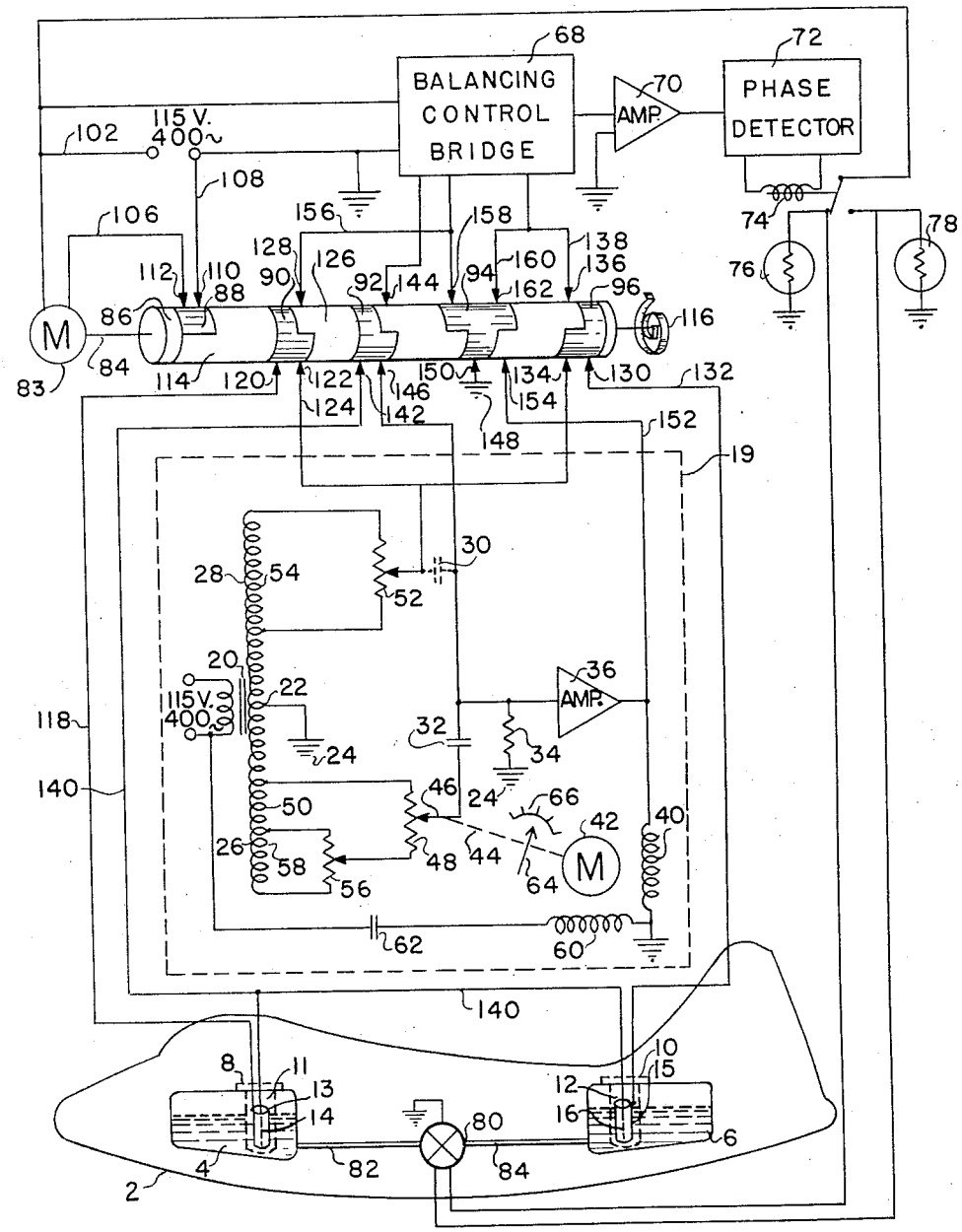

Briefly stated, this invention provides a capacitive type fuel quantity measuring system and a balancing control system which systems utilize a common set of electrodes.

In the various figures like numbers refer to like items.

Aircraft 2 contains fore tank 4 and aft tank 6. Tank unit 8 and tank unit 10 each contain a sensing capacitor 11 and 12 respectively consisting of a pair of electrodes 13 and 14, and 15 and 16 inserted in the fuel contained in the tanks. The sensing capacitors are described in greater detail hereinafter. As fuel is withdrawn from the tank the displacement of the liquid from between the electrodes by air results in a change of capacitance which unbalances a convential capacitance bridge circuit wherein the capacitance of the sensing capacitor is balanced against a fixed reference capacitor. The capacitance will change because the dielectric constant of air is 1.0 while that of a typical hydrocarbon fuel is in the vicinity of 2.0. Accordingly, if the sensing capacitor is completely immersed in fuel the capacitance will be twice that if the tank were empty at which time the dielectric is air. A partly filled tank would result in an intermediate value of capacitance. A self-balancing capacitance bridge 19 is used to measure the capacitance and thus determine the liquid level.

A preferred bridge circuit is disclosed in Fig. 1 wherein transformer 20 is used to transform a 115 volt-400 cycle alternating current from the aircraft supply to required voltage. The secondary of this transformer is tapped at point 22 which is connected to ground 24, thus providing portions 26 and 28, each of which serves as one arm of a modified Wheatstone bridge. The sensing capacitors 11 and 12, connected in parallel form the third arm of the bridge and a reference capacitor 32 serves as the fourth arm. In order to more clearly show the relationship of the sensing capacitors to the balance of the circuit an equivalent capacitor 30 is shown, in phantom, connected into the bridge circuit 19. The sensing capacitor 30 and the reference capacitor 32 are connected in common to the input of an amplifier 36 shown as a grid resistor 34 which is returned through ground 24 to the transformer tap 22. Variations in the capacitance of sensing unit 30 due to variation in the level of the fuel result in an unbalanced current flowing through grid resistor 34. The resulting signal voltage across resistor 34 is applied to amplifier 36, where it is amplified and, in turn, applied to one phase winding 40 of two phase motor 42. The output current from the amplifier 36 will drive motor 42 so as to cause shaft 44 to move the variable position arm 46 of potentiometer 48. Potentiometer 48 is connected across a portion 50 of transformer secondary 26, thus in effect, varying the position of arm 46 varies the voltage applied to the portion of the bridge circuit containing the reference capacitor 32. Motor 42 will continue to operate, moving variable arm 46 until the bridge has reached its null condition, at which time the bridge output voltage is substantially zero. Potentiometers 52 and 56 are provided for adjustment under empty and full conditions. Potentiometer 52 is connected across a portion 54 of the transformer secondary 28 and provides a means for adjusting the indicator pointer to zero on the scale when the tank is empty, and potentiometer 56 is connected in a similar fashion across a portion 58 of secondary 26 so as to provide a means of adjusting the scale reading so that a full scale reading is obtained on the indicator when the tank is filled to capacity. Current of the proper phase is obtained for the other phase winding 60 of the motor 42 by means of a connection to the primary of transformer 20 through a phase shifting capacitor 62. An indicator pointer 64 is coupled to potentiometer 48 by means of common shaft 44. Motor 42 is normally connected to the shaft 44 driving the variable contact arm 46 and indicator pointer 64 by a gear train, not shown. The sensing capacitors 11 and 12 are connected in parallel so that the bridge 19 senses the total capacitance present in the fuel system and accordingly indicator pointer 64 and dial 66 would act as a totalizer indicator and would present to the pilot of the aircraft an indication of the total amount of fuel present.

The sensing capacitors 11 and 12 are alternately connected to balancing control bridge 68 or quantity measuring bridge 19 by means of automatic switching means described later. The balancing control amplifier in turn controls means for actuating auxiliary rebalancing equipment such as control valves or pump systems which will function to restore fuel balance and with it the electrical balance of the bridge. The balancing control amplifier contains a bridge which compares, say, one wing tank capacitor unit against the other wing tank capacitor unit. The bridge will be in balance as long as the fuel levels in the tanks follow the proper predetermined relationship. Should one tank begin to empty too quickly the balance of the bridge would become upset. The output of bridge 68 is applied to amplifier 70 and in turn to a phase detector circuit 72. The phase detector actuates relay 74 which controls the operation of reversible pump 80 so as to restore the fuel balance relationship and with it electrical rebalance of the bridge. Indicator lamps 76 and 78 are energized from the 115 v.–400 cycle aircraft power supply by action of relay 74 to indicate to the pilot the center of gravity of the aircraft with respect to fuel in the tanks.

Pump 80 is used to transfer fuel between tanks 4 and 6 through lines 82 and 84 to effect balance as required. In some installations the tanks are arranged so that in one direction gravity feed is maintained and in the other direction a unidirectional pump is adequate to serve as a transfer means.

While not specifically mentioned it is to be understood that suitable electrical conductors are employed to electrically interconnect the various units.

Switch devices currently available are generally not suitable for use aboard an aircraft because of their inability to properly function over a useful life span under flight conditions. I have, however, found suitable the comutator type unit disclosed in the copending application of Ellery P. Snyder for "Torsion Oscillator Mechanical Switch" filed approximately December 21, 1953, Serial Number 399,266, now Patent No. 2,816,975 of December 17, 1957, and assigned to the assignee of the present invention.

A switch of this type is shown partly pictorially and partly schematically in the drawing. The motor 83 turns shaft 84 and in turn armature 86 which consists of an electrically insulating supporting member and a series of electrically conductive contacting surfaces 88, 90, 92, 94 and 96. The motor may be energized from the aircraft power 115 v.–400 cycle supply, through suitable conductive leads 102, 106, and 108, and contacts 110 and 112, and as shown in the drawing the circuit is completed through conductive element 86. Thus energized, the motor operates turning the armature 86, causing conductive element 88 to rotate until contacts 110 and 112 rest on armature 86 at area 114 which is electrically non-conductive, thus causing the circuit connection from the power source to the motor to be broken. Simultaneously with the turning of the armature a torsion spring 116 commonly termed a leaf spring is caused to wind up so as to store mechanical energy. Upon de-energization of motor 82, stored energy of spring 116 causes the armature to rotate in the opposite direction thus permitting contacts 110 and 112 to rest once more on conductive surface 88 so as to re-energize the motor whereupon the cycle will be repeated. It may be appreciated that armature 86 is now operating in an oscillatory fashion between two positions.

In greater detail, the switching action between the sensing capacitors and the balancing control amplifier and measuring circuit is as follows: conductor 118 provides an electrical connnection between electrode 13 and contact 120 which, through conductive surfaces 90 is electrically contacted with contact 122 which in turn is connected through conductor 124 to capacitance bridge 19. As the armature rotates, contact 124 is caused to rest on insulating portion 126 while at the same time contact 128 rests on conductive portion 62. Thus in conjunction with conductor 92 a connection is established between electrode 13 and the balancing control bridge 68. In a similar fashion contact 130, conductor 132 electrically connects conductive portion 96 with electrode 12. As the armature continues to oscillate connection is alternately made between contact 134 and contact 136 to conductive surface 96. This completes the connection together with conductors 132 and 138 between electrode 12 and either the balancing control bridge 68 or the capacitance bridge 19. For convenience in wiring electrodes 14 and 15 are connected in parallel by means of conductor 140 which leads to contact 142 which makes contact with conductive portion 92. As armature 86 oscillates between positions; connection is made between electrodes 14 and 15 and balancing control bridge 68 and capacitance bridge 19 through contacts 144 and 146 respectively. One conductor may be used for both electrodes in this case because the other electrodes are independently connected into the circuit and as will be explained hereinafter in the detailed description of the balancing control bridge. The two electrodes are electrically connected to a common point.

As pointed out earlier, the indicator 64 is driven by a motor 42 under control of amplifier 36 which is in turn controlled by the output of bridge circuit 19 containing the sensing capacitors. Thus, if the sensing capacitors are removed from the bridge circuit the resulting unbalance will cause an output voltage to be supplied to the amplifier which would result in operation of the motor causing the indicator to move. In order to prevent the indicator from moving to an erroneous reading, the conductive element 94 is connected to ground 148 through contact 150 so that when the armature is in the position wherein the sensing electrodes are connected to balancing control bridge 68, the output of the quantity measuring amplifier 36 is grounded through lead 152 and contact 154 to ground 148 through contact 150. Since the output is grounded, the motor will not operate permitting the indicator to remain resting at the last reading obtained when the sensing capacitors were connected to the balancing control circuit. In turn when the capacitance bridge 19 is connected to the sensing capacitors, the armature is in such a position that the input circuit of the balancing control bridge is connected to ground 148 through conductor 156 and contacts 158 and conductor 160 and contact 162 and conductive element 94.

As a safety feature the armature is arranged to rest in the position operatively connecting the capacitance bridge 19 to the sensing capacitor when the motor is deenergized or otherwise incapacitated.

An alternative switching means satisfactory for this application is the Series SQD Relay manufactured by Automatic Electric Company, Chicago, Illinois. The relay should be connected so as to have the normally closed contacts connected to the capacitance bridge 19, so that in the event of relay failure the pilot may have fuel quantity information.

In Fig. 2 there is disclosed a typical sensing capacitor adapted for use with the apparatus of this invention. The sensing capacitor is inserted through an opening in a tank (not shown). An aluminum head casting 170 having a flange portion 172 is bolted to the tank by means of bolts (not shown) passed through holes 174. Head casting 170 serves as the primary supporting element for the sensing capacitor. Bulkhead 176, an integral portion of the casting, serves to seal the portion of the sensing capacitor inside the tank from the outside atmosphere. Vapor tight terminals 178 and 179 and 180 pass through the bulkhead and are insulated therefrom by insulators as described hereinafter. Connectors 182, only one of which is shown in the cutaway view, permit coupling to the remotely located bridge circuit 19 or 68 through appropriate conductors. A cover plate 184 provides access to the terminals. A name plate 186 may be affixed to the cover plate 184.

Aluminum tube 188 serves as an electrical shield and structural support for the elongated sensing capacitor. Aluminum tube 188 is supported at one end by casting 170 and in turn at the other end it supports metal ring 190. Casting 170 and tube 188 are assembled together by shrink fitting. Ring 190 is spot welded to tube 188.

Tube 194 serves as one electrode of the capacitor. The outer end of electrode 194 is supported rigidly from the bulkhead 176 by means of two terminal bolts 178 and 179 each of which consists of a bolt attached to electrode 194 and insulated from bulkhead 176 by insulator 198 and 200. Nut 202 and terminal lug 204 secure the assembly rigidly in place and also permit the securing of a conductive lead 206, so as to complete the circuit from a connector (not shown) to electrode 194. Likewise nut 203 secures the other terminal bolt 179.

End plate 208 is attached to ring 190 by means of screws (not shown). Insulator 210 is affixed by a screw (not shown) to the center of end plate 208 and supports in concentric relationship to the other electrode, outer electrode 194. Insulator 192 is supported from insulator 210 by rod 211. The rod 211 and insulators 192 and 210 may be machined from a single piece of insulator plastic. It is to be noted that this tube 212 is provided with openings 213 for control of electrode areas for purpose of profiling as explained hereinafter. Insulator 210 is inserted with a sliding fit inside of inner tube 212 and does not support it at the lower end but merely positions it concentrically. At the upper end tube 212 is provided with a reduced portion 214 which passes through bulkhead 176 and is insulated therefrom by insulator 216. The end of portion 214 is threaded so that locking nut 215 may be tightened down onto insulator 216 so as to compress an insulator (not visible in this view) between the electrode 212 and the lower face of bulkhead 176. Lug 218 inserted under the tightening nut provides a convenient means for making electrical connection to electrode 212. Conductor 214 is shown interconnecting lug 218 and connector 182.

A simplified diagram of the balanicng control bridge 68 is shown in Fig. 3. A tapped secondary winding 230 of transformer 232 forms two legs of a bridge circuit while sensing capacitors 11 and 12 form the other two legs. If the bridge were in a balanced condition no current would flow through grid resistor 234 and therefore the same voltage would appear at point 236 and ground 238. Therefore, no signal would be applied to the amplifier 70. While dependent on the needs of the actual installation, it is assumed for purposes of explanation that the normal operation of the system being described is such that the relay contacts 77 used to control the auxiliary equipment are normally open and that contact 75 is normally closed. The phase detector circuit 46 is adjusted so that when the capacitance of capacitor 11 and capacitor 12 differ by a suitable magnitude, a signal is supplied by the amplifier 70 of such phase with relation to a comparison signal (the 115 v.–400 cycle aircraft power supply) applied to the phase detector 72 that relay 74 is energized and relay contacts 75 are closed actuating the auxiliary control equipment such as pump 80. To satisfy this condition, let it be assumed that the capacitance of the sensing capacitor 11 is greater than the value needed for a balanced bridge circuit.

If the balancing control capacitance of capacitor 11 drops below the valve required to balance the bridge circuit, the input signal to the amplifier becomes of such phase relationship because of the increased reactance in that leg of the bridge, that the signal applied to the phase detector 72 results in de-energizing the relay thus causing the relay to open closing contact 77. In turn, fuel is withdrawn from the other tank until the fuel level is again unbalanced in the other direction. As the fuel levels drop in both tanks, the relative sensing capacitor capacitance should decrease in such a fashion that the ratio between them remains constant.

The electrodes are normally shaped to vary in surface area in accordance with the cross-sectional area of the tank. This is important in the use of irregularly shaped tanks so that a change in capacitance resulting from a change in level is proportional to the change in quantity. This electrode area variation may be accomplished by perforating the inner tube as shown in Figure 2 or by varying the diameter of the tube.

The importance of "profiling" may best be understood by considering two tanks, one having a cross-sectional area of A sq. feet and one having an area of 2A sq. feet. For a drop in level of one foot, it is apparent that the fuel in one tank will be reduced in volume by A cubic feet and the other tank by 2A cubic feet. Since the capacitance of identical sensing capacitor in both tanks will vary the same amount, the function of balancing may not be accomplished. However, a properly "profiled" capacitor will overcome this difficulty by balancing the bridge when the proper weight (volume) ratio exists as opposed to simple liquid level ratio.

The preferred embodiment of this invention incorporates a bridge circuit differing slightly from the simplified circuit shown in Fig. 3. Sensing capacitor 11 is connected by cables 118 and 140 through armature 86 of the switching unit as described earlier, to the wiper arm 254 of "ratio adjustment potentiometer" 256. By controlling the voltage applied to the leg of circuit comprising the sensing capacitance 11, the potentiometer 256 determines the effective ratio between the capacitance of sensing capacitor 11 and capacitor 12 which must exist to achieve the desired operating point. Capacitor 12 is connected to the bridge circuit 68 in parallel with fixed capacitor 258 by means of cables 119 and 140. Capacitor 258 serves to provide a shift in operating point so as to permit one tank to be fully emptied so as to avoid ambiguous conditions at low level. A tap 264 rather than one end of the transformer primary 266 is grounded so that a portion of the winding between taps 264 and 268 can supply filament voltage to filaments 270 and 272 of the tubes 274 and 276 in the unit. Tube 274 is a dual triode one-half of which is used as a phase detector and the other half being used as a rectifier. Resistors 278 and capacitors 280 and 282 serve as the filter network for the rectified output. Relay 74 is actuated when the output voltage of amplifier tube 274 is of proper phase relationship with input voltage from the power supply. When the relay is actuated, normally closed contact 75 opens, while contact 77 closes completing the circuit between the power supply and auxiliary equipment such as a pump 80. Potentiometer 292 is provided as a means of regulating sensitivity. Connectors 300 are provided to facilitate connecting conductors between the various units.

The other components shown serve as in conventional resistance coupled vacuum tube circuits.

While I have disclosed the best mode contemplated of carrying out the invention, be it understood that further modifications and changes may be made within the scope of the appended claims.

What is claimed is:

1. Liquid quantity measuring and control apparatus comprising in combination: first capacitive sensing means in a first container of liquid, the capacitance of said capacitive sensing means being an indication of the quantity of liquid in the first container; second capacitive sensing means in a second container of liquid, the capacitance of said capacitive sensing means being an indication of the quantity of liquid in the second container; a balanceable bridge circuit including a capacitive arm and a source of voltage connected to said capacitive arm and adapted to produce an error signal proportional to the capacitance of said capacitive arm; means for balancing said bridge circuit so as to minimize said error signal; a capacitance comparison circuit including two opposed capacitive arms, a source of voltage for energizing said capacitance comparison circuit so as to produce a second error signal indicative of the relative capacitance of each of said opposed capacitive arms; automatic switching means for periodically alternately connecting, in sequence, (1) said first and said second capacitive sensing means, in parallel, to said balanceable bridge circuit as said capacitive arm thereof and (2) each of said first and said second capacitive sensing means, individually, into said comparison circuit as opposed capacitive arms; indicating means under control of said means for balancing said bridge circuit whenever said first and said second capacitive sensing means are connected to said balanceable bridge circuit for indicating the quantity of liquid in the first and second containers; control means connected to said comparison circuit and adapted to be responsive to said second error signal, flow control means under control of said control means responsive to said second error signal and adapted to readjust the relative quantity of liquid in the first and second containers to a predetermined ratio whenever said first and said second capacitive sensing means are connected to said comparison circuit.

2. The apparatus of claim 1 wherein said switching means includes an electrically actuatable means; means to connect said first and second capacitive sensing means to said comparison circuit when said electrically actuatable means is electrically energized; a spring return means adapted to mechanically actuate said switching means whenever said electrically actuatable means is de-energized; and means to connect said first and said second capacitive sensing means to said balanceable bridge whenever said spring return means actuates said switching means.

3. The apparatus of claim 1 including means to prevent said indicating means from changing whenever said first and said second sensing capacitors are connected to said capacitance comparison circuit.

4. The apparatus of claim 1 wherein said comparison circuit includes a manually controlled adjusting means adapted to vary the relative influence of at least one of said opposed arms on the other so as to provide means for manually adjusting the ratio of liquid in the first container to the liquid in the second container.

5. The apparatus of claim 1 wherein one of said opposed capacitive arms includes a fixed capacitor in parallel with one of said capacitive sensing means.

References Cited in the file of this patent
UNITED STATES PATENTS

| | | |
|---|---|---|
| 2,370,609 | Wilson et al. | Feb. 27, 1945 |
| 2,563,280 | Schafer et al. | Aug. 7, 1951 |
| 2,672,880 | Hermanson | Mar. 23, 1954 |